United States Patent Office 3,152,055
Patented Oct. 6, 1964

3,152,055
PROCESS FOR THE PRODUCTION OF AROMATIC CHLOROCARBOXYLIC ACID CHLORIDES
Ewald Katzschmann, Dortmund-Kruckel, Germany, assignor to Chemische Werke Witten, Witten (Ruhr), Germany
No Drawing. Filed June 24, 1960, Ser. No. 38,450
Claims priority, application Germany June 27, 1959
7 Claims. (Cl. 204—158)

This application is a continuation-in-part of my copending application Ser. No. 670,872, filed on July 10, 1957, now abandoned, and entitled Process of Producing Chlorides of Aromatic Mono- and Polycarboxylic Acids, the subject matter of which application is incorporated herein by reference insofar as necessary.

The present invention relates to the production of aromatic chlorocarboxylic acid chlorides, and more particularly, to a process of producing such aromatic chlorocarboxylic acid chlorides by means of elementary chlorine.

A number of methods are known for producing aromatic chlorocarboxylic acid chlorides. It is known, for example, to use a chloro-substituted carboxylic acid as the starting material in a process for producing chlorocarboxylic acid chlorides and to chlorinate the same with chlorination agents, such as, for example, phosgene (carbonyl chloride), thionyl chloride, or phosphorous pentachloride.

It has also been suggested that aromatic chlorocarboxylic acid chlorides may be made by first producing carboxylic acid chlorides from free carboxylic acids with known chlorination agents, such as those mentioned above, and then isolating the carboxylic acid chlorides and further chlorinating them in the presence of catalysts, such as, for example, iodine, iron, etc.

Both methods mentioned above are cumbersome and expensive, since, on the one hand, the carboxylic acid chlorides made from free carboxylic acids cannot be made with chlorine and, on the other hand, the carboxylic acid chlorides obtained during the chlorination of the non-substituted carboxylic acids must first be isolated from the usual chlorinating agents and their reaction products, and only thereafter may be subjected to a treatment with chlorine to produce the chlorocarboxylic acid chlorides in a separate reaction.

Chlorination of aromatic carboxylic acids to convert such acids into their aromatic chlorocarboxylic acid chlorides in a single process by means of elementary chlorine, which may be handled much simpler than phosphorous pentachloride and similar chlorinating agents, has not been possible in practice heretofore.

It is an object of the present invention to produce chlorides of aromatic chlorocarboxylic acids of a surprisingly high degree of purity by means of elementary chlorine in a simple and effective manner and with an excellent yield.

Other objects of the present invention and advantageous features thereof will become apparent as the description proceeds.

In principle, the process according to the present invention consists of a reaction wherein the esters of aromatic mono- or polycarboxylic acids are subjected, in a first stage, to the action of elementary chlorine in the absence of catalysts and at a temperature exceeding approximately 100° C., while exposing the heated esters to the action of light, until the ester is chlorinated and completely converted to the chloride thereof. Thereafter and without any intermediate operation, the reaction passes into a second stage, wherein a catalyst, such as iron filings or ferric chloride, for example, is added to the reaction mixture and more chlorine is introduced to produce the corresponding chlorocarboxylic acid chlorides of the carboxylic acid ester starting material. The process, therefore, involves a single reaction having two stages.

Tetra-chloro-phthalic acid dichloride, for example, may be obtained in a simple manner, according to the present invention. Terephthalic acid dimethyl ester is chlorinated with elementary chlorine in the presence of light in a first stage until the dimethyl ester has been converted to terephthalic acid dichloride. The reaction mixture then enters the second stage wherein, without any intermediate operation, a catalyst is added and more chlorine is introduced. Depending upon the duration of the chlorine action in this second stage, mixtures of mono-, di-, tri-, and tetra-chlorophthalic acid dichloride are obtained, or, after exhaustive or complete chlorination, almost pure tetrachlorophthalic acid dichloride is obtained. The chloride mixtures obtained in this process may be separated by distillation or crystallization.

The aromatic chlorocarboxylic acid chlorides produced according to the present invention are particularly useful in the production of esters of the afore-mentioned aromatic chlorocarboxylic acid chlorides and alcohols, which are especially suitable as softeners, for the production of poly-condensates and synthetic resins and many other uses.

Chlorination of the esters of aromatic carboxylic acids to the corresponding chlorocarboxylic acid chlorides according to the present invention is carried out at a temperature between about 100° and 220° C., the preferred temperature being between about 150° and 180° C.

The term "exposure to light," as it is employed in the present specification and the claims annexed hereto, indicates exposure to direct or dispersed sunlight or irradiation with the light of an artificial light source, especially of a light source which is capable of emitting short-wave rays, such as the light of a mercury vapor lamp and the like.

It is one of the characteristic features of the present invention that catalysts, which are known to cause chlorination of the nucleus of aromatic compounds, such as iron, iron chloride, iodine, or the like, are absent from the chlorination mixture during the first stage of the reaction thereof.

An additional characteristic feature of the present invention is that the acid chlorides of the aromatic carboxylic acids produced by the reaction of chlorine with an ester of the aromatic carboxylic acids in the presence of light and at temperatures of from 100° to 220° C. are further chlorinated partially or completely with elementary chlorine in a second stage, without an intermediate operation or interruption of the reaction in the first stage, by the addition of known nuclear chlorination catalysts at similar temperatures.

The process according to the present invention permits the production of the aromatic chlorocarboxylic acid chlorides in a simple and satisfactory manner. Thus, the process according to the present invention represents a very considerable advance in the art of producing aromatic chlorocarboxylic acid chlorides.

The following examples serve to illustrate the present invention without, however, limiting the same thereto.

*Example I*

194 g. terephthalic acid dimethyl ester are heated in a cylindrical glass container to 160° C. Chlorine is then introduced into the heated ester while exposing the reaction mixture to light. Due to the reaction heat, the temperature rises to 195° C. After three hours, 430 g. chlorine have been consumed. Now, without interruption of the chlorine introduction, 0.25% iron filings, i.e., 0.5 g. are added, and the temperature is slowly increased to 220° C. and maintained until a total of 750 g. chlorine have been passed through the reaction mixture. Subsequently, nitrogen is blown through the reaction product for 15 minutes. The resulting reaction product amounts to 290 g., which is then subjected to distillation. At a sump temperature of from 174° to 176° C., 263 g. are converted at a temperature of from 169° to 173° C., and a pressure of 16 mm. The residue of 23 g. is removed. By saponifying with sodium carbonate, chloroterephthalic acid is isolated with the following characterizing numbers: Acid number, 480; Cl, 30.6%.

The calculated characterizing numbers for dichloroterephthalic acid are: Acid number, 478; Cl, 30.2%.

*Example II*

102 g. benzoic acid methyl ester are chlorinated under exposure to light at a temperature of from 70° to 160° C. After the volume has been increased so as to correspond to the initial volume, 0.3 g. ferric chloride are added while the chlorination continues. A total of 794 g. chlorine are introduced, whereby a considerable portion of the chlorine is contained in the waste gas at the end of the reaction. Thereafter, nitrogen is blown through the reaction product for ten minutes. The total yield of chlorobenzoyl chloride amounts to 225.7 g., i.e., 96.8% of the theoretical value, calculated for pentachlorobenzoyl chloride.

It is preferable not to increase the temperature beyond 180° C., since otherwise considerable quantities (50% of the theoretical value and more) of hexachlorobenzol will be produced.

*Example III*

2,200 g. chlorine are admixed to 970 g. terephthalic acid dimethyl ester under exposure to light and at a temperature of from 160° to 175° C. Then, 5.8 g. iron powder are added, whereupon another 1,400 g. of chlorine are admixed at a temperature of 180° C. Subsequently, nitrogen is blown through the reaction product for 20 minutes, and the total reaction product is poured into 4 liters of ligroin, filtered hot over carbon and allowed to stand for crystallization. The crystallizate is separated by filtration, washed in petroleum ether and dried in a vacuum exsiccator over carbon. The yield is 925 g., i.e. 54.7% tetrachloro-terephthaloyl dichloride with the following characterizing numbers:

|  | Experimented | Calculated |
| --- | --- | --- |
| Saponification number | 661 | 662 |
| Cl, percent | 61.9 | 62 |
| Melting point, ° C | 144.3 |  |

The filtrate is freed from ligroin by distillation and the residue again used for chlorination. The above-described method of operation is favorable inasmuch as the complete reaction requires much time and a high excess of chlorine.

*Example IV*

240 g. chlorine are added to 97 g. terephthalic acid dimethyl ester at 160° C. and under exposure to light, whereupon, without interruption of the chlorine introduction, 0.1 g. ferric powder is added and chlorination continued until no further absorption of chlorine takes place. The temperature is increased to 190° C. After the passage of nitrogen through the reaction product, the entire reaction product is poured into 1.2 liters methanol while being shaken well and is boiled for 5 hours under reflux. The still hot methanolic solution is filtered over carbon and left to stand to allow crystallization. 145 g., i.e., 88.4% of the theoretical value of the dry crystallizate, are obtained having the following characterizing numbers:

|  | Experimented | Calculated |
| --- | --- | --- |
| Saponification number | 341 | 341 |
| Cl, percent | 42.8 | 43.2 |
| Melting point, ° C | 158.3 |  |

After the distillation of the methanol from the mother liquor, a mixture of lower chlorinated chloroterephthalic acid dimethyl esters is obtained.

The first stage of the reaction according to the present invention may be carried out according to the teachings in my copending application Ser. No. 670,872, mentioned above, the subject matter of which is incorporated herein by reference insofar as necessary.

The process in accordance with my copending application Ser. No. 670,872 consists in subjecting the esters of aromatic mono- or, respectively, polycarboxylic acids with methanol to the action of elementary chlorine in the absence of catalysts at a temperature exceeding about 100° C., while exposing the heated esters to the action of light.

For instance, chlorination of the methyl ester of benzoic acid proceeds according to the following equation:

(I)

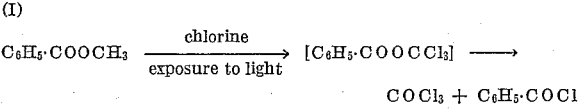

$$C_6H_5 \cdot COOCH_3 \xrightarrow[\text{exposure to light}]{\text{chlorine}} [C_6H_5 \cdot COOCCl_3] \longrightarrow$$

$$COCl_3 + C_6H_5 \cdot COCl$$

When using polycarboxylic acids, such as phthalic acid, the reaction proceeds as follows:

(II)

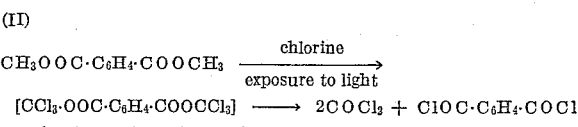

$$CH_3OOC \cdot C_6H_4 \cdot COOCH_3 \xrightarrow[\text{exposure to light}]{\text{chlorine}}$$

$$[CCl_3 \cdot OOC \cdot C_6H_4 \cdot COOCCl_3] \longrightarrow 2COCl_2 + ClOC \cdot C_6H_4 \cdot COCl$$

The benzoic acid trichloromethyl ester, which is probably formed as an intermediate on chlorination of benzoic acid methyl ester, as indicated in the Equation I above, is a very unstable compound and readily decomposes to form benzoyl chloride and phosgene. The terephthalic acid di-, tri-chloromethyl ester obtained by chlorination of terephthalic acid dimethyl ester is even more readily decomposed and yields terephthalic acid dichloride and phosgene, as indicated in Equation II.

In the place of benzoic acid methyl ester and the terephthalic acid dimethyl ester used in the preceding examples, other aromatic mono- and polycarboxylic acid esters may be employed in my process. For instance, phthalic acid dimethyl ester, α- or β-naphthoic acid methyl esters, benzoic acid benzyl ester, and other esters identified in my copending application Ser. No. 670,872 may be used. Especially suitable starting materials are monocyclic aromatic carboxylic acid methyl esters.

The procedure to be followed with other aromatic mono- and polycarboxylic acid esters is the same as described in the preceding examples. The reaction according to the present invention thus is generally applicable to such aromatic carboxylic acid esters and proceeds with the same ease and with the same high yield as that of the esters described hereinabove in the preceding examples.

The reaction is preferably carried out in vessels which are provided with a jacket for steam heating and water cooling made of, or lined with, materials resistant to chlorine at the reaction temperatures, such as enamel, stoneware, and the like.

The vessel is also provided with an agitator, a fractionating column, and a condenser for condensing phosgene which is produced during the chlorination of the methyl esters of aromatic mono- and polycarboxylic acids. Since practically no other by-products are produced during the process according to the present invention, it is quite simple to separate the chlorination product.

When working in reaction vessels which do not permit direct exposure to sunlight, or to an external light source, immersion lamps are used to irradiate the reaction mixture. Especially suitable are mercury vapor lamps, especially lamps which emit light rays of the wave length between 4,000 and 5,000 Angstroms. Such immersion lamps have the advantage that a very high light quantum yield is achieved since these lamps can be completely surrounded by the reaction mixture.

Of course, many changes and variations in composition of the starting esters, in the reaction conditions, temperatures, duration, kind and source of actinic rays, the manner of working up the reaction mixture, and of isolating and purifying the resulting products and the like, may be made by those skilled in the art in accordance with the principles set forth hereinabove, and I, therefore, do not wish to be limited to the details and specific examples described herein only for illustrative purposes, but intend to cover all such changes and modifications as are encompassed by the scope of the appended claims.

I claim:

1. A process for the production of aromatic chlorocarboxylic acid chlorides from an ester selected from the group consisting of the methyl esters of aromatic mono- and polycarboxylic acids, which comprises the steps of passing elemental chlorine through said ester until no further chlorine is absorbed in a reaction zone in the presence of light while heating the same at a temperature of between approximately 150 and 180° C. whereby a high purity acid chloride corresponding to said ester is formed, then adding a nuclear chlorination catalyst to said reaction mixture and continuing without interruption the passing of chlorine through said heated reaction mixture for a period of time sufficient to produce the chlorocarboxylic acid chlorides of the ester.

2. A process for the production of aromatic chlorocarboxylic acid chlorides as defined in claim 1, wherein the elemental chlorine is passed through the heated reaction mixture in the presence of sunlight.

3. A process for the production of aromatic chlorocarboxylic acid chlorides as defined in claim 1, wherein the elemental chlorine is passed through the heated reaction mixture in the presence of light from a mercury vapor lamp which emits short-wave rays.

4. A process for the production of aromatic chlorocarboxylic acid chlorides as defined in claim 1, wherein said nuclear chlorination catalyst is selected from the group consisting of iron filings and ferric chloride.

5. A process for the production of the corresponding aromatic chlorocarboxylic acid chlorides from benzoic acid methyl ester comprising the steps of passing elementary chlorine through said ester until no further chlorine is absorbed in a reaction zone in the presence of light while heating the same at a temperature of between approximately 150 and 180° C. whereby the high purity acid chloride corresponding to said ester is formed, then adding a nuclear chlorination catalyst to said reaction mixture, and continuing without interruption the passing of chlorine through said heated reaction mixture for a period of time sufficient to produce the chlorocarboxylic acid chlorides of the ester.

6. A process for the production of the corresponding aromatic chlorocarboxylic acid chlorides from terephthalic acid dimethyl ester comprising the steps of passing elementary chlorine through said ester until no further chlorine is absorbed in a reaction zone in the presence of light while heating the same at a temperature of between approximately 150 and 180° C. whereby the high purity acid chloride corresponding to said ester is formed, then adding a nuclear chlorination catalyst to said reaction mixture, and continuing without interruption the passing of chlorine through said heated reaction mixture for a period of time sufficient to produce the chlorocarboxylic acid chlorides of the ester.

7. A process for the production of the corresponding aromatic chlorocarboxylic acid chlorides from an ester selected from the group consisting of the methyl esters of aromatic mono- and polycarboxylic acids, which consists essentially of the steps of passing elementary chlorine through said ester until no further chlorine is absorbed in a reaction zone in the presence of light while heating the same at a temperature of between approximately 150 and 180° C. whereby the high purity acid chloride corresponding to said ester is formed, then adding a nuclear chlorination catalyst to said reaction mixture and continuing the passing of chlorine through said heated reaction mixture for a period of time sufficient to produce the chlorocarboxylic acid chlorides of the ester.

References Cited in the file of this patent

UNITED STATES PATENTS

| | | |
|---|---|---|
| 2,412,389 | Cass | Dec. 10, 1946 |
| 2,816,134 | Toland | Dec. 10, 1957 |